United States Patent
Seyedi et al.

(10) Patent No.: US 11,503,387 B2
(45) Date of Patent: Nov. 15, 2022

(54) ZERO ADDED LATENCY PACKET REROUTE VIA SILICON PHOTONICS

(71) Applicant: HEWLETT PACKARD ENTERPRISE DEVELOPMENT LP, Houston, TX (US)

(72) Inventors: Mir Ashkan Seyedi, Palo Alto, CA (US); Luca Ramini, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/880,881

(22) Filed: May 21, 2020

(65) Prior Publication Data

US 2021/0368247 A1    Nov. 25, 2021

(51) Int. Cl.
*H04J 14/00*    (2006.01)
*H04Q 11/00*    (2006.01)
(Continued)

(52) U.S. Cl.
CPC ....... *H04Q 11/0066* (2013.01); *H04B 10/516* (2013.01); *H04B 10/66* (2013.01); *H04Q 2011/0073* (2013.01)

(58) Field of Classification Search
CPC .. H04J 14/0283; H04J 14/0201; H04J 14/021; H04J 14/083; H04J 14/02;
(Continued)

(56) References Cited

U.S. PATENT DOCUMENTS 6,411,752 B1    6/2002 Little et al.
6,674,558 B1    1/2004 Chang et al.
(Continued)

FOREIGN PATENT DOCUMENTS

CN    102882601 B    4/2015
CN    106533993 B    4/2019
(Continued)

OTHER PUBLICATIONS

Cheng Li, "Silicon Photonic Transceiver Circuit with Microring Resonator Bias-Based Wavelength Stabilization in 65nm CMOS", Jun. 6, 2014, IEEE Journal of Solid state circuits, p. 1419-1420 (Year: 2014).*

(Continued)

*Primary Examiner* — Pranesh K Barua
(74) *Attorney, Agent, or Firm* — Sheppard Mullin Richter & Hampton LLP

(57) ABSTRACT

Systems and methods are provided for zero-added latency communication between nodes over an optical fabric. In various embodiments, a photonic interface system is provided that comprises a plurality of optical routing elements and optical signal sources. Each node within a cluster is assigned an intra-cluster wavelength and an inter-cluster wavelength. All the nodes in a cluster are directly connected and each node in a cluster is directly connected to one node in each of the plurality of clusters. When an optical signal from a different cluster is received at a node serving as the cluster interface, the photonics interface system allows all wavelength signals other than the node's assigned wavelength to pass through and couple those signals to an intra-cluster transmission signal. Zero latency is added in rerouting the data through an intermediate node.

10 Claims, 7 Drawing Sheets

(51) Int. Cl.
  *H04B 10/66*  (2013.01)
  *H04B 10/516* (2013.01)
(58) Field of Classification Search
  CPC .. H04J 14/0208; H04J 14/022; H04J 14/0212; H04Q 2011/0009; H04Q 2011/0016; H04Q 11/0005; H04B 10/60
  See application file for complete search history.

(56) References Cited

U.S. PATENT DOCUMENTS

| | | | |
|---|---|---|---|
| 6,892,032 | B2 | 5/2005 | Milton et al. |
| 7,130,540 | B2 | 10/2006 | Simmons et al. |
| 7,716,271 | B1 | 5/2010 | Bertsekas et al. |
| 8,335,434 | B2 | 12/2012 | Beausoleil et al. |
| 9,229,163 | B2 | 1/2016 | Schwetman et al. |
| 9,316,784 | B2 | 4/2016 | Krishnamoorthy et al. |
| 9,621,273 | B2 | 4/2017 | Nagarajan |
| 9,693,124 | B2 | 6/2017 | Robinson et al. |
| 9,893,950 | B2 | 2/2018 | Chen et al. |
| 10,564,512 | B2 | 2/2020 | Sun et al. |
| 2003/0016411 | A1 | 1/2003 | Zhou et al. |
| 2003/0128980 | A1 | 7/2003 | Abeles |
| 2009/0110348 | A1 | 4/2009 | Bratkovski et al. |
| 2012/0082454 | A1* | 4/2012 | Ooi ............... H04J 14/0208 398/49 |
| 2012/0237155 | A1* | 9/2012 | Zheng ............ G02B 6/12007 385/24 |
| 2014/0044015 | A1 | 2/2014 | Chen et al. |
| 2015/0163570 | A1 | 6/2015 | Zid et al. |
| 2015/0168803 | A1 | 6/2015 | Xu et al. |
| 2015/0309265 | A1 | 10/2015 | Mehrvar et al. |
| 2017/0223437 | A1* | 8/2017 | Lee ................. H04B 10/675 |
| 2018/0217328 | A1 | 8/2018 | Heroux et al. |
| 2018/0217344 | A1 | 8/2018 | Fini et al. |
| 2018/0287818 | A1 | 10/2018 | Goel et al. |
| 2019/0089461 | A1 | 3/2019 | Sun et al. |
| 2020/0287627 | A1 | 9/2020 | Johnson |

FOREIGN PATENT DOCUMENTS

| | | |
|---|---|---|
| CN | 110012368 A | 7/2019 |
| EP | 1271827 | 2/2003 |

OTHER PUBLICATIONS

Binetti et al., "Indium Phosphide Photonic Integrated Circuits for Coherent Optical Links", IEEE Journal of Quantum Electronics, vol. 48(2), Feb. 2012, pp. 279-291.

Cheng et al., "Photonic switching in high performance datacenters [Invited]", Optics Express 16022, vol. 26(12), Jun. 8, 2018, 22 pages.

Cheng et al., "Ultralow-crosstalk, strictly non-blocking microring-based optical switch", Photonics Research, Chinese Laser Press, vol. 7(2), Jan. 16, 2019, pp. 155-161.

Mansoor et al., "Review of Progress in Optical Ring Resonators with Crosstalk Modelling in OADMS", Research Gate, Oct. 2015, 11 pages.

Proietti et al., "Self-driving Reconfigurable Silicon Photonic Interconnects (Flex-LIONS) with Deep Reinforcement Learning", SC19, Nov. 2019, 3 pages.

Yu et al., "A scalable silicon photonic chip-scale optical switch for high performance computing systems", Optics Express, vol. 21(23), Dec. 24, 2013, 13 pages.

Zhu et al., "Fully programmable and scalable optical switching fabric for petabyte data center", Optics Express, vol. 23(3), Feb. 5, 2015, 18 pages.

Buex et al., "Optical Ring Network-on-Chip (ORNoC): Architecture and Design Methodology," DATE'11: Conference on Design, Automation and Test in Europe, Sep. 2, 2011, 7 pages.

Li et al., "Silicon photonic transceiver circuits with microring resonator bias-based wavelength stabilization in 65 nm CMOS", IEEE Journal of Solid—State Circuits, 49(6), 2014, pp. 1419-1436.

Cheng, Q. et al.; "Recent Advances in Optical Technologies for Data Centers: A Review"; Optica; Nov. 2018; pp. 1354-1370; vol. 5; No. 11; Optical Society of America.

* cited by examiner

ZERO ADDED LATENCY PACKET REROUTE VIA SILICON PHOTONICS

DESCRIPTION OF RELATED ART

High performance computing (HPC) generally refers to aggregating computing power in a way that delivers much higher performance than one could get out of a typical desktop computer or workstation in order to solve large problems in science, engineering, or business. Clusters of computing nodes are connected over an interconnect (also referred to as a "fabric") to enable the nodes to communicate with each other to solve large-scale problems. Each node can comprise a plurality of processors or processing components. Each node typically communicates over the fabric through the use of one or more network interface cards (NICs).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
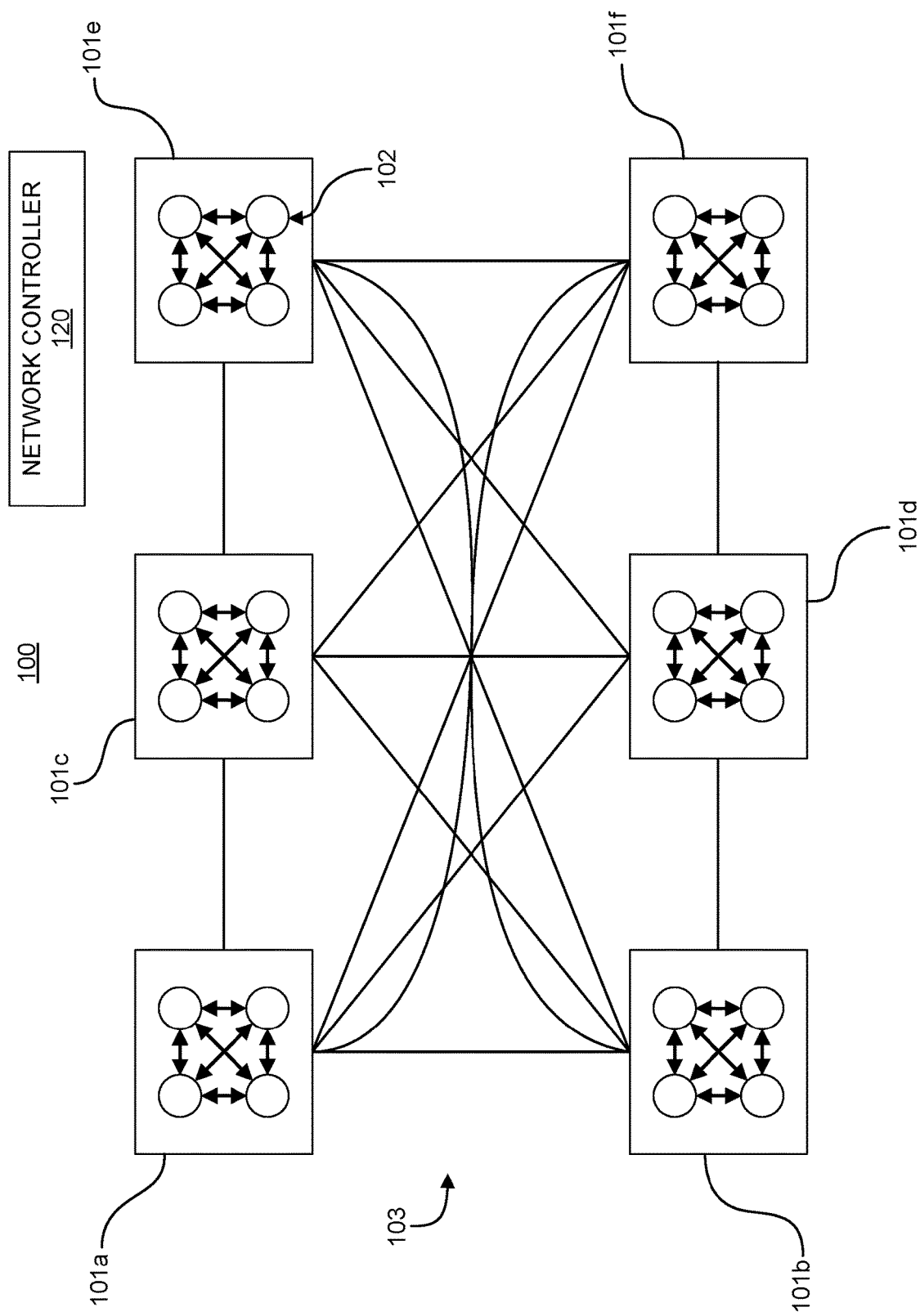
FIG. 1 illustrates an example network in which embodiments of the technology may be implemented.

The figures are not exhaustive and do not limit the present disclosure to the precise form disclosed.

DETAILED DESCRIPTION

In large computing networks, such as a high-performance computing (HPC) systems, a key figure of merit is latency. There are several sources of latency within such networks. One source is with respect to requests for information by one node from one or more other nodes in the network. When working on an application, a processor component of a node (e.g., the CPU) may require information or data that is not stored locally on the node. Therefore, if the CPU does not know where the information is maintained in the network, the CPU needs to make a request to the fabric, which is received by other nodes connected over the fabric. A processor component of each of the nodes on the fabric must then stop threads or applications worked on at the respective node and service the request, checking to see whether it has the requested information. This interruption of the processor components on the connected nodes adds to latency because the processor components need to pause its current process, delaying completion of its intended task.

Another source of latency arises from the physical limitations on large networks. Each node has a finite number of physical connections, limiting the number of other nodes it can be directly connected to over the fabric, regardless of the network topology. As an example, a conventional CPU generally have up to 128 I/O lanes, limiting the CPU to directly connecting up to 128 other nodes on the fabric. For large HPC implementations, more than 128 nodes may be connected to each other. To ensure that all nodes are capable of communicating with all other nodes, messages must be passed through intermediate nodes that receive the message from a sender or sender node (to whom it is directly connected), determine if the message is meant for the intermediate node by stopping its processes to read the addressing information, and routing the message to the intended end point (e.g., end or receiver node). This adds to the latency in the system.

To connect to each other, the nodes generally include a network interface card (NIC). A traditional NIC provides an interface between the processor(s) of the node and the interconnect fabric, including a plurality of buffers, virtual address memory spaces, and other logistical components for routing that are not desirable to have on the processor. Essentially, the NIC is a separate chip capable of maintaining this information, to which the processor can communicate and cause the NIC to perform the routing functionality. However, the processor still has to analyze each packet as it comes in and out, even though the actual functions may be offloaded to the NIC. Therefore, the processor is still being interrupted whenever a data packet/message is received.

In many implementations, a smart NIC may be included in each node to address latency issues. The smart NIC offloads some of the intelligence that a processor connected to a traditional NIC needs to perform. Smart NICs generally include an on-board processing component for implementing some aspects of network traffic processing that would need to be performed by the processor of the node. When a message comes in, the smart NIC is capable of determining whether the incoming data packets are meant for the node of the smart NIC by reading the address of the intended endpoint (i.e., another node). If not, the smart NIC is capable of sending the message off to the intended recipient without interrupting the processor of the node. While this can reduce the amount of interrupts of the node processor, there is still latency in routing the data because the smart NIC needs to save the data in a buffer, read the address in the data, and make a comparison of the address with the virtual address space for the node. Where there is no match, the smart NIC then needs to place the data on a transmit buffer and sent on an output transmission to another node.

As optical interconnects are increasingly implemented within communication networks, including serving as the fabric for HPC implementations, latency is further increased due to the need for optical to electrical conversions. Optical communications provide higher bandwidth potential over traditional electrical cabling and can transmit signals effectively over longer distances. However, the data must be converted into the electrical domain in order for the processors of the node to use the received data. Not only must the optical data be converted into the electrical domain for the processor to interpret, if the data is meant for a different endpoint or node the data must be converted back into the optical domain for transmission. This increases the latency in message response.

Embodiments of the technology disclosed herein provides systems and methods for optical routing of data packets. The technology reduces the latency of data transmission between nodes and clusters within a networking fabric by keeping the routing of data packets entirely in the optical domain before any optical-to-electrical conversions. In various embodiments, each node within the network includes a photonics interface system configured to transmit and receive optical signals. All the nodes within a respective cluster are directly connected to each other, with each node having at least one direct connection to a node within a different cluster. In various embodiments, within each cluster, a plurality of wavelengths are utilized to route data packets internal to the cluster, with at least one wavelength assigned to a respective node. Through use of photonic interface systems in accordance with the present disclosure, zero-added latency communication between indirectly connected nodes within the network is enabled, thereby enabling the reduction of physical cable requirements and eliminating the latency added through costly conversions of optical signals by intermediate nodes.

FIG. 1 illustrates an example network 100 within which embodiments of the technology disclosed herein can be implemented. The example network 100 is provided for illustrative purposes only and should not limit the scope of the technology to only the depicted embodiment. For ease of discussion, the network 100 is depicted as a high-performance computing (HPC) system, but the technology is not limited to only HPC systems or environments. The technology of the present disclosure is applicable to any network or system in which data is transmitted within over an optical interconnect. As shown in FIG. 1, the network 100 can comprise a plurality of clusters 101a-f (generally, "the cluster 101," collectively, "the clusters 101."), each cluster 101 comprising a plurality of nodes 102. In various embodiments, the nodes 102 can comprise servers or other computing devices including one or more processors. In various embodiments, each cluster 101 can comprise the same number of nodes 102, while in other embodiments, one or more clusters 101 may comprise a different number of nodes 102 than at least one other cluster 101. In various embodiments, the clusters 101 may be co-located in the same location (e.g., the same data center, the same rack within a data center), while in other embodiments at least one cluster 101 may be located remotely from the other clusters 101 (e.g., a different data center, a different rack within the same data center).

Each node 102 can include a photonics interface system (as illustrated and described in more detail below with respect to FIGS. 3 and 5) configured to enable the node 102 to transmit and receive optical signals from other nodes 102 within the network 100. Each of the nodes 102 within each cluster 101 can be directly connected over an optical fiber to each of the other nodes 102 within the same cluster 101. The photonic interface system of each node 102 can also be directly connected to at least one node of every other different cluster 101 over an optical interconnect fabric 103. In various embodiments, the optical interconnect fabric 103 can comprise one or more of single-mode fibers, multi-mode fibers, or a combination thereof. For ease of reference, a single line is illustrated in FIG. 1 connecting each cluster 101 to the other clusters 101, each line representing the at least one direct connection from a node 102 of a first cluster 101 to a node 102 of a second cluster different from the first cluster within the network 100.

In various embodiments, the network 100 can include a network controller 120 communicatively coupled to the clusters 101 (and nodes). The network controller 120 can be configured to manage the operation of the nodes within the network 100. In various embodiments, the network controller 120 may be configured to set the network topology for the network 100, including the routing assignments defining the communication paths (as discussed in greater detail below with respects to FIGS. 2A-5).

Figure 2A:
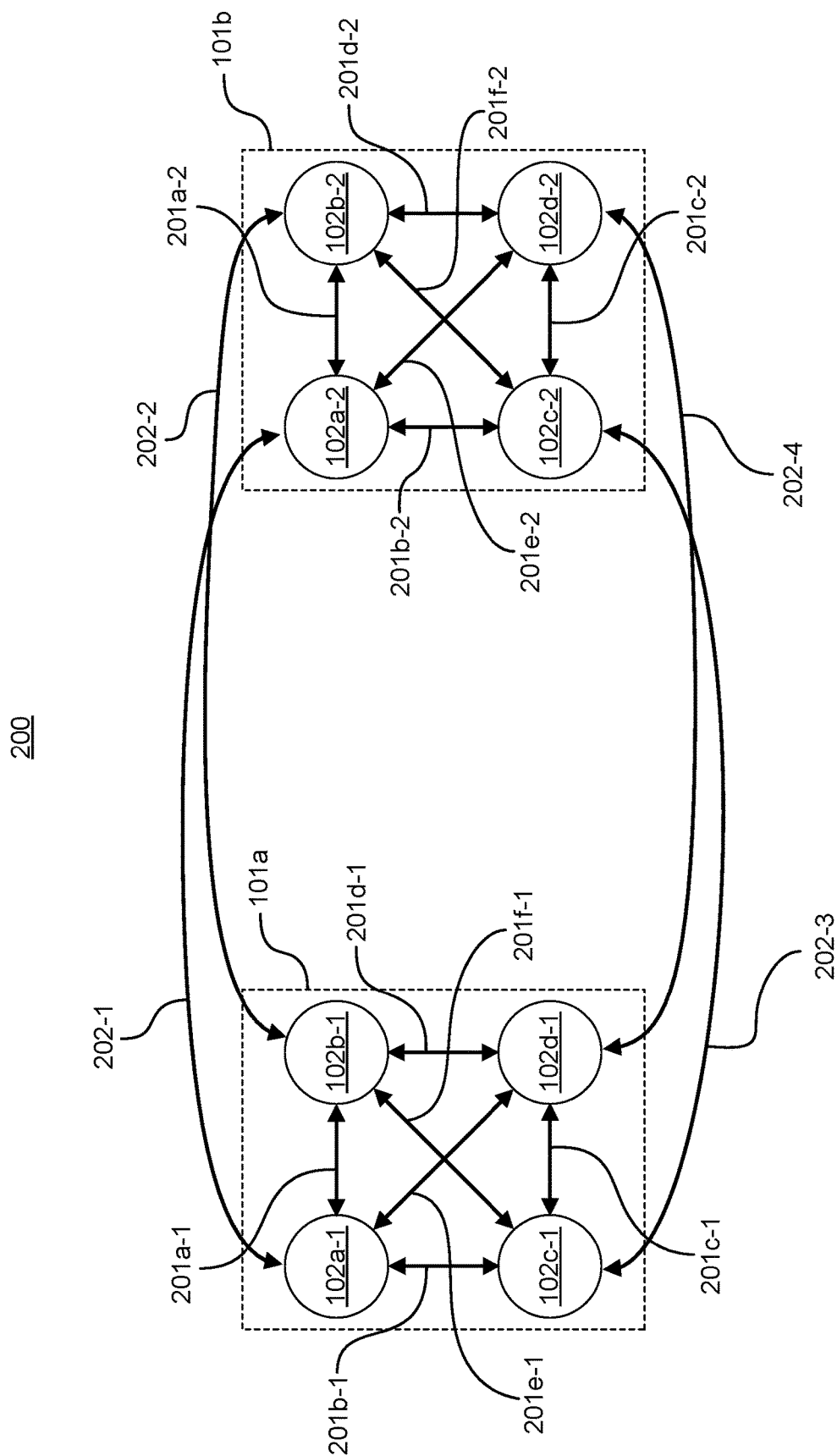
FIG. 2A shows an example optical interconnection between two clusters in accordance with the technology disclosed herein.

FIG. 2A illustrates an example of the optical interconnection 200 between two example clusters 101 in accordance with embodiments of the technology disclosed herein. The example optical interconnection 200 is presented for illustrative purposes only and should not be interpreted as limiting the scope of the technology of the present disclosure. For ease of reference, the optical interconnection 200 shows the interconnection between two clusters 101a, 101b, but the optical interconnection 200 can include a plurality of clusters 101. As shown in FIG. 2A, the first cluster 101a comprises four nodes 102a-1 to 102d-1 (generally, "the node 102-1," collectively, "the nodes 102-1") and the second cluster 101b comprises four nodes 102a-2 to 102d-2 (generally, "the node 102-2," collectively, "the nodes 102-2"). Although each cluster 101a, 101b is depicted having four nodes 102, the technology disclosed herein is applicable to clusters 101 comprising a plurality of nodes 102 (e.g., two, four, six, eight, ten). In various embodiments, one or more of the clusters 101 may comprise a different number of nodes than at least one other cluster 101.

As illustrated in FIG. 2A, each node 102 is connected to each other node 102 within the clusters 101a, 101b over intra-cluster direct connections 201a-1 to 201f-1 and 201a-2 to 201f-2, respectively (generally, "the intra-cluster direct connection 201," collectively, "the intra-cluster direct connections 201") of the optical interconnection fabric 103 (shown in FIG. 1). Each intra-cluster direct connection 201 can comprise one or more optical channels between each node 102. In various embodiments, each of the intra-cluster direct connections 201 may comprise one or more of single-mode optical fiber, multimode optical fiber, or a combination thereof.

In various embodiments, the optical interconnection 200 includes a plurality of inter-cluster direct connections 202-1 to 202-4 (generally, "the inter-cluster direct connection 201," collectively, "the inter-cluster direct connections 202") enabling communication between the clusters 101a, 101b. As illustrated, each node 102-1 has an inter-cluster direct connection 202 with a node 102-2. As a non-limiting example, the node 102b-1 of cluster 101a has a direct connection to the node 102b-2 of the second cluster 101b. In the illustrated embodiment, each node 102-1, 102-2 can include four direct connections (e.g., three intra-cluster direct connections 202 and one inter-cluster direct connection 204). In this way, a total of 192 direct connections comprise the optical interconnection 200 over the optical interconnect fabric 103 shown in FIG. 1 (e.g., six clusters, each comprising four nodes). Therefore, 192 optical fibers are required, which can be realized in 192 uni-directional optical fiber cables or 96 bi-directional optical fiber cables (each cable enclosing a transmit fiber and a receive fiber). Referring to the example embodiment of FIG. 2A, node 102a-1 of the first cluster 101a is connected to the node 102a-2 of the second cluster 101b, node 102b-1 of the first cluster 101a is connected to the node 102b-2 of the second cluster 101b, and so on. In this manner, each node 102 serves as the cluster interface for a respective node in each other cluster 101.

In current network topologies, in order for each node (e.g., node 102) to be directly connected to every other node 102 in a network (e.g., network 100) (i.e., an all-to-all topology) a total of ($N^2$−N) optical fibers would be required, wherein N equals the total number of nodes. Using the example topology depicted in FIG. 2A, to directly connect all eight nodes would require 56 total optical fibers ((8×8)−8=56). If the number of nodes is doubled (i.e., a total of 16 nodes), the number of optical fibers required to directly connect all of the nodes to each other node would roughly quadruple (240 optical fibers) to provide the direct connections. This exponential increase does not scale to large networks (comprising a large number of nodes and clusters) as the number of fibers required becomes untenable. Using the technology disclosed herein, the number of direct connections required for all-to-all connectivity can be reduced. The total number of direct connections (and, therefore, optical fibers) within embodiments of the technology disclosed herein can be calculated as:

$$N_t((M-1)+(N_c-1)),\qquad(1)$$

where M comprises the number of clusters, $N_c$ comprises the number of nodes in each cluster, and $N_t$ comprises the total number of nodes in the network. Each node within the cluster serves as a cluster interface (i.e., the access point) for all the other clusters in the. Moreover, because the messages remain in the optical domain during routing, the latency introduced due to intermediate node routing is eliminated. Therefore, for the depicted embodiment of FIG. 2A (having 2 clusters, each comprising 4 nodes), equation 1 results in 32 optical fibers required to enable the same connectivity as the 56 optical fibers required in traditional topologies. Therefore, if bi-directional optical fiber cables are implemented (i.e., each optical fiber cable comprises 2 optical fibers, a transmit fiber and a receive fiber), embodiments of the present disclosure enable the same number of connections over 16 optical fiber cables (as shown in FIG. 2A) compared to 28 optical fiber cables required using current networking technologies.

Figure 2B:
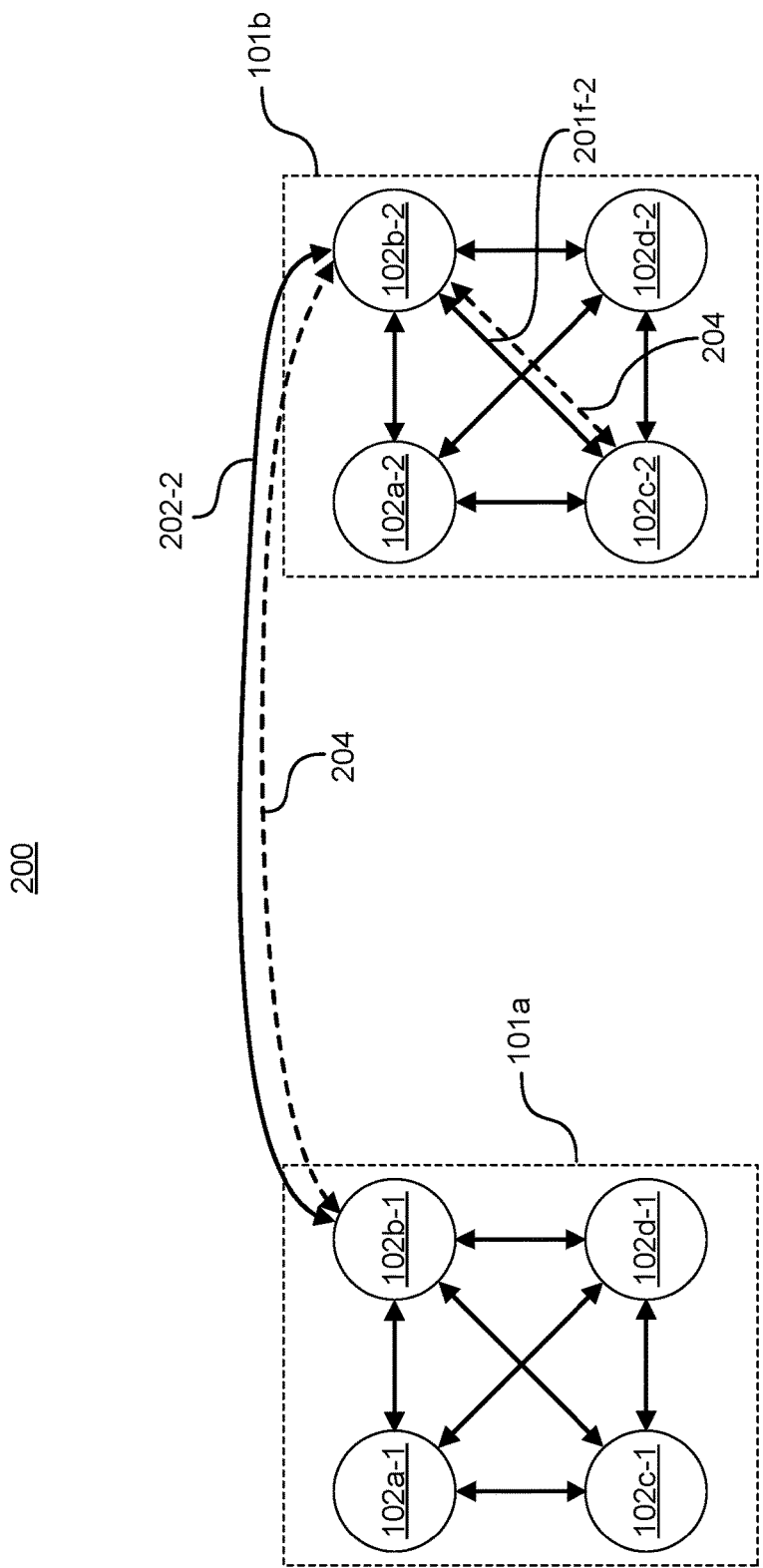
FIG. 2B shows an example indirect communication path between two nodes in accordance with embodiments of the technology disclosed herein.

FIG. 2B illustrates an example direct and indirect communication between a node of a first cluster with all of the nodes of a second cluster in accordance with embodiments of the technology disclosed herein. For ease of discussion, the example direct and indirect communication is shown with reference to the communication interconnection 200 of FIG. 2A. Common references between figures should be interpreted such that all descriptions of those references apply unless otherwise stated. As shown in FIG. 2B, the node 102b-1 of the first cluster 101a is directly connected to the node 102b-2 of the second cluster 101b over the inter-cluster direct connection 202-2 (as indicated by the solid line). Therefore, the node 102b-2 serves as the cluster interface for the node 102b-1 to the cluster 101b. In order for the node 102b-1 to communicate with the node 102c-2 in the second cluster 101b, it must send the data packets intended for node 102c-2 to the node 102b-2.

In current networks, the node 102b-2 would need to convert the optically-received signal to an electrical signal that can be processed either by at least one of the node's main processors or a processing circuit of a smart NIC to read the recipient address in the data. After identifying the recipient as the node 102c-2, the node 102b-2 must then convert the data back into the optical domain, place in a transmit buffer, and transmit the re-converted data to the node 102c-2 over the intra-cluster direct connection 201f-2. Each step takes time, adding latency to the system. Implementing the photonics interface system in accordance with the technology disclosed herein, no conversion of the signal is required between the sending node (the node 102b-1) and the intended recipient node (the node 102c-2). As shown in FIG. 2B, an indirect communication path 204 (identified by broken lines) is formed between the node 102b-1 of the first cluster 101a and the node 102c-2 of the second cluster 101b. Although this connection is not a direct connection, the optical data packets intended for the node 102c-2 traverse from the node 102b-1 without being converted, processed, or otherwise analyzed by one or more other nodes in the network (e.g., network 100 of FIG. 1). An indirect communication path 204 is created for the node 102b-1 to each of the nodes 102a-2, 102c-2, and 102d-2 through the node 102b-2. Essentially, one or more virtual "direct" connections are formed from the nodes 102b-1 of the first cluster 101a to each of the one or more nodes 102 (i.e., the nodes 102a-2, 102c-2, 102d-2) directly connected to the node 102 serving as the cluster interface node (i.e., the node 102b-2).

In various embodiments, the communication topology between the example clusters 101 of FIGS. 1-2B can comprise encoded wavelength assignment for communications within each cluster 101 and between each cluster interface nodes to implement the lower latency communication paths between the nodes in any cluster. For ease of discussion, the routing assignments shall be discussed with respect to the two cluster example illustrated in FIGS. 2A and 2B, but the routing assignment discussed below can be scaled for a plurality of different clusters and a plurality of nodes per cluster and/or within the network. In the non-limiting example, each cluster 101a, 101b can have a localized set of wavelengths, each localized wavelength assigned to a node within the same cluster. Table 1 below provides an example assignment frequencies of a localized set of wavelengths for the first cluster 101a and the second cluster 101b.

TABLE 1

| Cluster 101a | | Cluster 101b | |
|---|---|---|---|
| Node | Assigned Wavelength | Node | Assigned Wavelength |
| 102a-1 | $\lambda_{a1}$ | 102a-2 | $\lambda_{a2}$ |
| 102b-1 | $\lambda_{b1}$ | 102b-2 | $\lambda_{b2}$ |
| 102c-1 | $\lambda_{c1}$ | 102c-2 | $\lambda_{c2}$ |
| 102d-1 | $\lambda_{d1}$ | 102d-2 | $\lambda_{d2}$ |

As shown in Table 1, the first cluster 101a includes a first localized set of wavelengths comprising ($\lambda_{a1}, \lambda_{b1}, \lambda_{c1}, \lambda_{d1}$) and the second cluster 101b includes a second localized set of wavelengths comprising ($\lambda_{a2}, \lambda_{b2}, \lambda_{c2}, \lambda_{d2}$). Each frequency within the respective localized set is assigned to each node within the respective cluster. Therefore, for intra-cluster communication (i.e., communication over the intra-cluster direct connections 201-1 shown in FIG. 2A) each node 102-1 will be capable of modulating data packets onto a specific wavelength to send the data to that respective node directly. The same is shown for the second cluster 101b, as well. In some embodiments, the first localized set and the second localized set may comprise the same set of wavelengths. In this way, the wavelength routing for intra-cluster communications can be performed such that the same wavelength is assigned to the same order node within each local cluster (i.e., the node 102a-1 and 102a-2 would each be assigned the wavelength $\lambda_a$ for intra-cluster communication).

In addition to having a wavelength of a localized set of wavelengths assigned as shown in Table 1, each node 102 within the cluster may further have a wavelength of an inter-cluster set of wavelengths assigned therewith. In various embodiments, the inter-cluster wavelength assigned to each node can be different from the localized wavelength assigned. Table 2 illustrates an example of the wavelength assignment for each node in the depicted embodiment of FIG. 2A.

TABLE 2

| | Cluster 101a | | | Cluster 101b | |
| --- | --- | --- | --- | --- | --- |
| Node | Assigned Localized Wavelength | Assigned Inter-Cluster Wavelength | Node | Assigned Localized Wavelength | Assigned Inter-Cluster Wavelength |
| 102a-1 | $\lambda_{a1}$ | $\lambda_{a3}$ | 102a-2 | $\lambda_{a2}$ | $\lambda_{a3}$ |
| 102b-1 | $\lambda_{b1}$ | $\lambda_{b3}$ | 102b-2 | $\lambda_{b2}$ | $\lambda_{b3}$ |
| 102c-1 | $\lambda_{c1}$ | $\lambda_{c3}$ | 102c-2 | $\lambda_{c2}$ | $\lambda_{c3}$ |
| 102d-1 | $\lambda_{d1}$ | $\lambda_{d3}$ | 102d-2 | $\lambda_{d2}$ | $\lambda_{d3}$ |

As shown in Table 2, the inter-cluster set of wavelengths can comprise ($\lambda_{a3}$, $\lambda_{b3}$, $\lambda_{c3}$, $\lambda_{d3}$). Accordingly, if the node 102c-1 was to receive a signal from its corresponding cluster interface node in the second cluster 101b containing data modulated on the intra-cluster frequency $\lambda_{c3}$, the node 102c-1 can identify that the data is intended for itself, and process the data accordingly. In the example Table 2, the inter-cluster set of wavelengths used for each cluster 101a, 101b contains the same wavelengths. In some other embodiments, each inter-cluster set of wavelengths may comprise one or more different wavelengths.

In some embodiments, each node in each respective cluster may be assigned more than one localized wavelength and/or inter-cluster wavelength. As a non-limiting example, the localized set of wavelengths for the first cluster 101a may comprise greater than four wavelengths, with at least one of the local nodes 102-1 having at least two localized wavelengths assigned. Assigning more than one wavelength for intra- and/or inter-cluster communication may provide additional bandwidth for a given communication path, redundancy in the event an issue occurs with respect to the circuitry and components for one or more of the assigned frequencies, or a combination of both.

Assigning each node in the network with one or more wavelengths enables the photonics interface system at each node within the network to serve as pass-through optical devices for any data packets not intended for the receiving node. FIG. 3 provides an example photonics interface system 300 in accordance with embodiments of the technology disclosed herein. The example photonics interface system 300 is provided for illustrative purposes only and should not be interpreted as limiting the scope of the technology to only the depicted embodiment. In various embodiments, the photonics interface system 300 can be included within each of the plurality of nodes of a network, such as the network 100 and nodes 102 discussed with respect to FIGS. 1-2B. For ease of reference, the photonics interface system 300 shall be discussed using the photonics interface system 300 of the node 102a-1 of FIGS. 2A-2B. The discussion of the components and operations of the photonics interface system 300 with respect to FIG. 3 is applicable to all photonic interface systems 300 within the nodes of a network unless explicitly stated otherwise. Moreover, for ease of discussion, the photonics interface system 300 is discussed with respect to a network comprising two clusters, each cluster comprising four nodes (e.g., a 2×4 network), similar to the FIGS. 2A and 2B. Although discussed with respect to a 2×4 network, the technology disclosed herein is applicable for networks comprising a plurality of clusters, each cluster comprising a plurality of nodes, and the technology disclosed herein should not be interpreted as limited to only the depicted embodiment. Finally, although a particular layout and configuration of the various components of the photonic interface system 300 are shown, the specific placement of components within the photonic interface system 300 can be modified based on the particular implementation and should not be interpreted to limit the scope of the technology to only the specific configuration/layout depicted in FIG. 3.

In various embodiments, the photonics interface system 300 can be implemented in lieu of one or more other interface cards (e.g., traditional NIC, smart NIC, etc.), while in other embodiments the photonics interface system 300 can be used in combination with one or more other interface cards. In various embodiments, the photonics interface system 300 may be co-packaged with one or more electronic processing components configured to convert optical signals intended for the respective node (e.g., as part of an integrated circuit).

Figure 3:
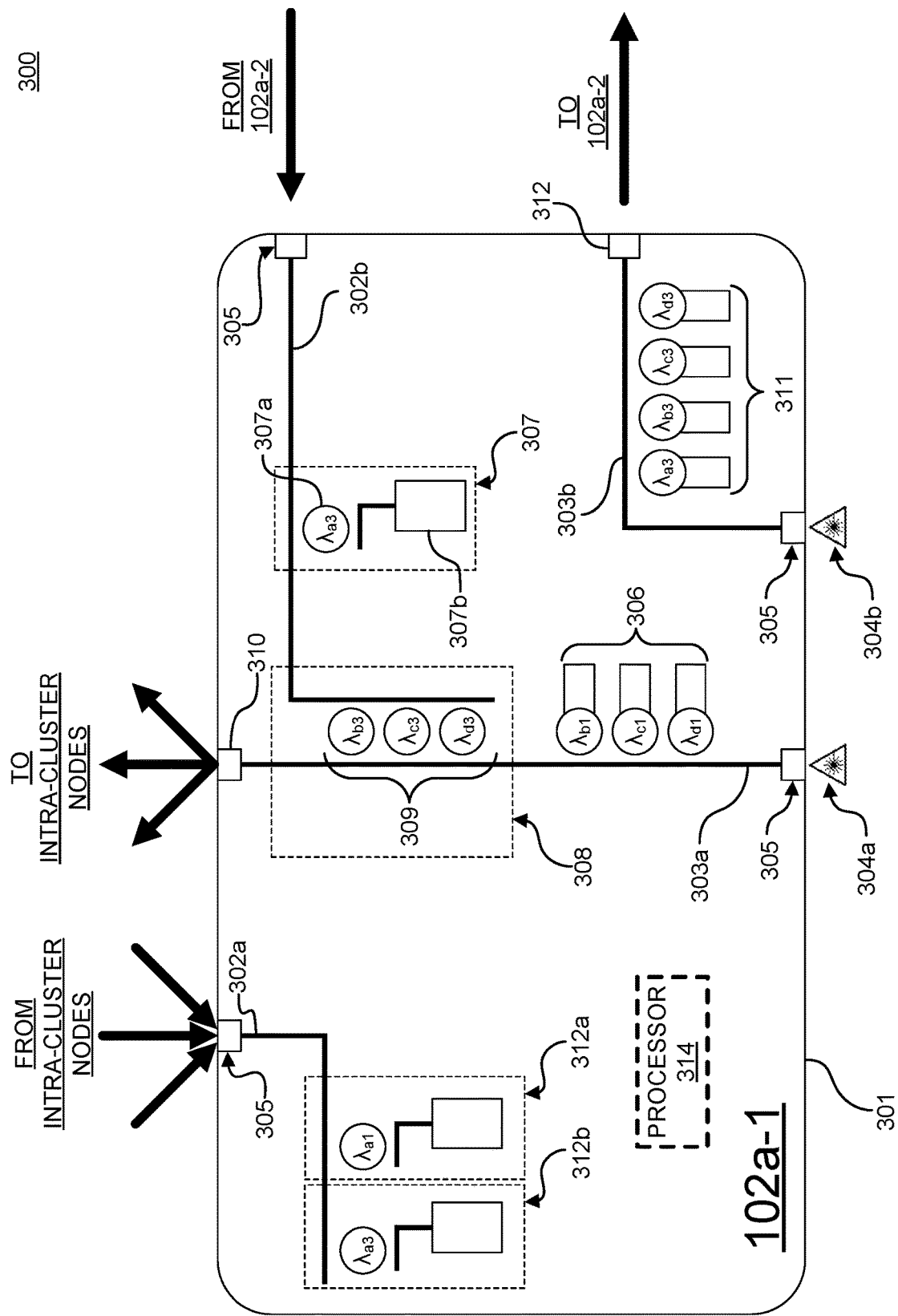
FIG. 3 illustrates an example photonics interface system in accordance with embodiments of the technology disclosed herein.

As shown in FIG. 3, the photonics interface system 300 can comprise a photonics substrate 301 with a plurality of optical elements disposed thereon. In various embodiments, the photonic substrate 301 can comprise one or more photonics materials, including but not limited to silicon, glass, silicon on insulator (Sol), or other materials capable of routing optical signals and/or used in silicon photonic devices. In various embodiments, the photonics substrate 301 may comprise one or more types of semiconductor substrate material. A plurality of optical routing elements 302a, 302b, 303a, 303b (generally, "the optical routing element 302, 303," collectively, "the optical routing elements 302, 303") can be disposed on and/or within the photonics substrate 301. In various embodiments, the plurality of optical routing elements 302, 303 can comprise one or more of optical waveguides, optical fibers, or other optical routing components.

The optical routing elements 302, 303 may be configured to serve as unidirectional routing elements such that light traverses the optical routing elements 302, 303 in only one direction. In various embodiments, optical routing elements 302, 303 may comprise a set of receive optical routing elements 302a, 302b (generally, "the receive optical routing element 302," collectively, "the receive optical routing elements 302") and a set of transmit optical routing elements 303a, 303b (generally, "the transmit optical routing element 303," collectively, "the transmit optical routing elements 303").

Within the set of transmit optical routing elements 303, an intra-cluster transmit routing element 303a and an inter-cluster transmit routing element 303b may be included. In various embodiments, a plurality of intra-cluster transmit routing elements 303a and/or a plurality of inter-cluster transmit routing elements 303b may be included. As shown in FIG. 3, the intra-cluster transmit routing element 303a can be optically coupled to an inter-cluster transmission source 304a. Although shown as adjacent to the photonics substrate 301, the intra-cluster transmission source 304a (as well as the inter-cluster transmission source 304b) can be disposed on the photonics substrate 301. In various embodiments, the intra-cluster transmission source 304a can be configured to couple light of one or more wavelengths into an input end of the intra-cluster transmit routing element 303a through a coupling component 305. Non-limiting examples of input coupling component 305 include grating couplers, dielectric mirrors, DBR mirrors, or other coupling component applicable for fiber-to-chip and chip-to-fiber coupling. In various embodiments, the inter-cluster transmission source 304a can be configured to generate light of each wavelength of the localized set of wavelengths, like those discussed above with respect to Tables 1 and 2.

In some embodiments, the inter-cluster transmission source 304a can be configured to generate light of one or more of the localized wavelengths when the respective node (in the illustrated embodiment, the node 102a-1) has data to communicate to the respective one or more other nodes within the cluster. As a non-limiting example, the intra-cluster transmission source 304a could be configured to generate light at the wavelength $\lambda_{c1}$ but not the other localized wavelengths when the node 102a-1 is sending data packets to the node 102c-1. The intra-cluster transmission source 304a can comprise one or more single-wavelength optical sources, multi-wavelength optical sources, or a combination thereof. In some embodiments, where more than one optical source comprises the intra-cluster transmission source 304a, the coupling component 305 may comprise a plurality of coupling components 305 configured to couple light at each of the various frequencies onto the intra-cluster transmission routing element 303a. In some embodiments, a combiner (not shown in FIG. 3) may be disposed on the input end of the intra-cluster transmission routing element 303a to combine the light generated by more than one optical source of the intra-cluster transmission source 304a into a single, multi-wavelength optical signal, the coupling component 305 being configured to couple the single, multi-wavelength optical signal on the intra-cluster transmission routing element 303a.

A plurality of intra-cluster modulators 306 can be optically coupled to the intra-cluster transmission routing element 303a. Data intended for one or more nodes within the cluster (in FIG. 3 the cluster 101a) needs to be modulated or encoded onto the light signal traversing the intra-cluster transmission routing element 303a. An intra-cluster modulator 306 can be configured to modulate the data packets onto the frequency traversing the intra-cluster transmission routing element 303a associated with the intended recipient. As illustrated in FIG. 3, an intra-cluster modulator 306 is optically coupled to the intra-cluster transmission cluster 303a and configured to modulate information onto a specific localized wavelength. As a non-limiting example, if the node 102a-1 wanted to send data to the node 102b-1 within the cluster 101a, the $\lambda_{b1}$-tuned optical modulator 306 can modulate light of that frequency within the intra-cluster transmission routing element 303a. Once modulated, light of frequency $\lambda_{b1}$ will be encoded with the data intended for the node 102b-1. In various embodiments, the intra-cluster modulators 306 may comprise one or more types of optical modulators known in the art, included but not limited to ring modulators.

As discussed above, each node 102 within a respective cluster 101 is configured to serve as the cluster interface for one node 102 in a different cluster 101. With reference to FIG. 2A, the node 102a-1 serves as the cluster interface for the node 102a-2 of the second cluster 101b. Therefore, if the node 102a-2 wants to send data or a message to any of the nodes 102-1 in the first cluster 101a, the node 102a-2 must send the information to the node 102a-1. Accordingly, the set of receive optical routing elements 302 can comprise an inter-cluster receiving element 302b. In various embodiments, the inter-cluster receiving element 302b can be connected to one or more optical fibers from the node 102a-2 of the second cluster 101b. A coupling component 305 (similar to the coupling component 305 discussed with respect to the intra-cluster transmission routing element 303a) can be configured in various embodiments to couple the incoming light from the node 102a-2 onto the inter-cluster receive routing element 302b through an input end of the inter-cluster receive routing element 302b. Discussions concerning the method of inputting and/or outputting light to and/or from an optical routing element 302, 303 shall be interpreted as applying to all input and output of light of all the optical routing elements 302, 303, unless expressly stated otherwise.

In various embodiments, a node receiver 307 can be optically coupled to the inter-cluster receive routing element 302b. In various embodiments, one or more node receivers 307 may be optically coupled to the inter-cluster receive routing element 302b. The node receiver 307 is configured to detect when data is present on the inter-cluster frequency assigned for itself. Here, per Table 2 above, the node receiver 307 is configured to detect light of frequency $\lambda_{a3}$ is included in the inter-cluster communication received from the node 102a-2. In various embodiments, if light at the respective frequency is detected, on or more filter components 307a can filter out light at that frequency from the signal on the inter-cluster receive routing element 302b. The filtered light signal can be routed from the filter component 307a to a photodetector 307b configured to detect the light. In various embodiments, the photodetector 307b can be configured to convert the filtered light into the electrical domain, which can be routed (not shown in FIG. 3) to one or more processors of the node 102a-1.

If light at any other inter-cluster wavelength (or any other frequency at all) is present on the inter-cluster receive routing element 302b it will continue to traverse the inter-cluster receive routing element 302b towards an interchange section 308. The interchange section 308 enables data received on the inter-cluster receive routing element 302b to be added to the intra-cluster communication signal on the intra-cluster transmit routing element 303a. Because the light was not filtered out at the node receiver 307, the remaining data must be intended for another node within the cluster 101a. In the interchange section 308, one or more optical filters 309 may be included. Each optical filter 309 may be tuned to remove from the inter-cluster receive routing element 302b a respective frequency present thereon, and adding that filtered frequency to the optical signal on the intra-cluster transmission routing element 303a. In this way, the messages and data from the node 102a-2 to one or more of the other nodes within the first cluster 101a can be "directly" routed, without any need for the node 102a-1 to stop any processes it is running to analyze the received signal. In this way, the latency between indirectly connected nodes in a network can be minimized to zero-added latency. Unlike other routing approaches known in the art, and the prior art NICs, the technology of the present disclosure does not add any additional latency to the transmission of the optical signal between indirectly connected nodes. In this way, the latency between indirectly connected nodes in the network can be reduced to time-of-flight of the optical signal in the optical fiber. The messages intended for other recipient nodes at routed in a passive manner.

Intra-cluster communications from the node 102a-1 are output from the intra-cluster transmission routing element 303a through an output coupling component 310 disposed on an output end of the intra-cluster transmission routing element 303a. In various embodiments, the output coupling component 310 may be similar to the coupling input coupling component 305 discussed above, and the discussion of the input coupling component 305 applies equally to the output coupling component 310. In various embodiments, the output coupling component 310 may be configured to demultiplex and/or split the optical signal on the intra-cavity transmission routing element 303a into a plurality of output signals, each output signal being sent over one of the intra-cavity direct connections like those discussed with respect to FIGS. 2A and 2B. In some embodiments, a demultiplexing and/or splitting component (not shown in FIG. 3) may be coupled to the output coupling component 310 and configured to perform the demultiplexing and/or splitting. In various embodiments, the signal on the intra-cluster transmission routing element 303a can be split into three output signals, each including all of the frequencies included in the multi-wavelength signal on the intra-cluster transmission element 303a after the one or more intra-cluster modulators 306 and/or the interchange section 308. In various embodiments, the output signal may be demultiplexed such that three separate output signal is created, each output signal including only the frequencies assigned to the directly connected node. As a non-limiting example, a first output signal can comprise the wavelengths from Tables 1 and 2 above associated with the node 102b-1, a second output signal can comprise the wavelengths associated with the node 102c-1, and a third output signal can comprise the wavelengths associated with the node 102d-1.

As can be seen, the combination of the intra-cluster transmission routing element 303a and the inter-cluster receive routing element 302b, through the interchange section 308, can create and send a multi-wavelength optical signal including the data intended for nodes other than the node 102a-1. Moreover, this can be performed without requiring any interruption of processes occurring on the node 102a-1. The combined intra-cluster transmission signal is output from the intra-cluster transmission routing element 303a through an output coupling component 310 at an output end of the intra-cluster transmission routing element 303a.

The photonic interface system 300 can further include optical elements enabling the node 102a-1 to receive intra-cluster communications and transmit inter-cluster communications. As shown in FIG. 3, the photonic interface system 300 can further include an inter-cluster transmission routing element 303b. In various embodiments, an inter-cluster transmission source 304b may be optically coupled to the inter-cluster transmission routing element 303b through an input coupling component 305, which can be similar to the other input coupling components 305 in some embodiments. The inter-cluster transmission source 304b may be similar to the intra-cluster transmission source 304a, and the discussion of such is applicable to the inter-cluster transmission source 304b. In various embodiments, the inter-cluster transmission source 304b may be configured to generate light of the inter-cluster set of wavelengths. In various embodiments, the intra-cluster transmission source 304a and the inter-cluster transmission source 304b can comprise the same transmission source 304 is the same wavelengths of the localized set and the inter-cluster set are the same, wherein the source light generated is split (either by the coupling component 305 of a splitting component (not shown in FIG. 3)) and coupled to each of the intra-cluster transmission routing element 303a and the inter-cluster transmission routing element 303b.

Similar to the intra-cluster communication, the data is modulated or encoded on the signal within the inter-cluster transmission routing element 303b. In various embodiments, a plurality of inter-cluster modulators 311 can be optically coupled to the inter-cluster transmission routing element 303b. In various embodiments, the inter-cluster modulators 311 may comprise similar components as those of intra-cluster modulators 306. Each inter-cluster modulators 311 can be configured to modulate information onto a respective one of the inter-cluster set of wavelengths, based on the target of the data/message from node 102a-1. Although the node 102a-1 may want to send data to a different node within the second cluster 101b, the modulated output of the inter-cluster transmission routing element 303b is sent over the direct inter-cluster connection (similar to the inter-cluster direct connection 201-1 shown in FIG. 2A) to the node 102a-2. This is because the node 102a-2 serves as the node 102a-1's interface to the cluster 101b. Any and all messages that the node 102a-1 wants to send to any node 102-2 of the second cluster 101b will be sent to its cluster interface (i.e., the node 102a-2). The photonics interface system 300 of the node 102a-2 would perform a similar type of passive routing as discussed above with respect to the inter-cluster receive routing element 302b and the intra-cluster transmission routing element 303a.

In various embodiments, one or more intra-cluster communications can be receiver and coupled on a intra-cluster receive routing element 302a. In some embodiments, a multiplexer or adder (not shown in FIG. 3) may be included before, within, or after the input coupling component 305 and configured to multiplex and/or add the optical signals received from the plurality of intra-cluster nodes on intra-cluster direct connections 201-1. In various embodiments, each of the other nodes within the first cluster 101a are aware of the assigned localized wavelength for node 102a-1 and are configured to modulate data and/or messages intended for the node 102a-1 on light of that respective frequency. In the example embodiment, the node 102a-1 is associated with the frequency $\lambda_{a1}$, and therefore the other nodes within the first cluster 101a can be configured to modulate data from itself to the node 102a-1 onto that respective wavelength. When light at frequency $\lambda_{a1}$ is detected on the intra-cluster receive routing element 302a, the light can be filtered out by a receive node 312a. In various embodiments, the receive node 312a can be similar to the receive node 307 discussed with respect to the inter-cluster receive routing element 302b, except that the receive node 312a can be tuned to the assigned intra-cluster wavelength for node 102a-1 whereas the receive node 307 is tuned to the assigned inter-cluster wavelength. Light filtered out of the intra-cluster receive routing element 302a can be converted into the electrical domain by a photodetector, similar to the setup discussed with respect to the receive node 307.

In addition to the intra-cluster wavelength, the photonics interface system 300 may receive data modulated on the inter-cluster wavelength assigned to the node 102a-1. As discussed above, each node of a cluster is only connected to one node in a different node, with that node serving as the interface to all the other nodes in the cluster. Therefore, if one or more other nodes 102-2 besides the node 102a-2 of the second cluster 101b needs to communicate with the node 102a-1 that communication must be sent through one of the other nodes of the first cluster 101a. Therefore, the photonics interface system 300 of the node 102a-1 can further include another receive node 312b configured to detect light of the assigned inter-cluster wavelengths assigned to the node 102a-1. In this manner, the node 102a-1 is capable of receiving data from another node 102-2 (other than 102a-2) of the second cluster 101b through a virtual "direct" connection, without the need for a direct connection (i.e., an additional physical connection and cable).

With respect to the optical signals input to and output from the photonics interface system 300, such communication my occur over one or more of type of optical fibers (e.g., ribbon fibers, multi-mode fibers), chip ferrules, waveguides, or other optical routing component known in the art to transfer optical signals from one point to the next. In various embodiments, the photonics interface system 300 can comprise an interposer board, which can be mounted onto a printed circuit board (PCB). One or more optical to electrical interfaces may electrically connect the photonics interface system 300 to the electrical interface of the device. In this manner, the optical data determined to be intended for the respective device (i.e., the data encoded on the wavelength assigned to the respective device) can be converted by the one or more photodetectors and provided to the CPU or other processing circuitry.

Programming the photonics interface system 300 enables different routing topologies between the nodes within a network without the need to change the hardware of the system. As a non-limiting example, through programming of the photonics interface system 300 the network topology can be changed without the need to change any of the physical connections between devices. In various embodiments, the photonic interface system 300 may further include a programming processor 314 to control the tuning of the various optical filters and optical modulators of the photonics interface system 300. In the depicted embodiment of FIG. 3, the programming processor 314 is optionally shown disposed on the photonics substrate 301 and may be communicatively coupled to a plurality of tuning components connected to each of the optical filters and optical modulators of the photonic interface system 301. Non-limiting examples of tuning components comprises heaters, electrical contacts, electromagnetic field source, or other types of tuning components known in the art to tune the resonance of optical elements similar to the optical filters and optical modulators of the photonics interface system 300. In various embodiments, the processor 314 may be co-packaged with the photonics substrate 301 (e.g., disposed on a PCB and communicatively coupled to the elements on the photonic substrate 301). The programming processor 314 may further be configured to send the converted information from each of the photodetectors to one or more main processors of the node 102a-1 in various embodiments. In some embodiments, the programming processor 314 may have an associated non-transitory machine-readable storage device (e.g., memory) communicatively coupled therewith and maintaining information identifying the wavelength assignments for the intra-cluster nodes as well as for the nodes of the other clusters.

Although the inputs and outputs are illustrated as being separated in the photonics interface system 300, in various embodiments the node 102a-1 may communicate with the node 102a-2 over a bidirectional optical cable fiber. In various embodiments, the transmit fiber core(s) of the optical fiber connecting the node 102a-1 and the node 102a-2 may be terminated in a transmit ferrule configured to connect to a first optical port of the node 102a-1, and the receive fiber core(s) of the optical fiber may be terminated in a receive ferrule configured to connect to a second optical port of the node 102a-1, while in other embodiments the transmit core(s) and receive core(s) may be terminated in a transmit/receive ferrule and configured to connect to a inter-cluster optical port of the node 102a-1. In some embodiments, one or more optical ports (both intra-cluster and inter-cluster optical ports) may be disposed on the photonics substrate 301, while in other embodiments the one or more optical ports may be separate from the photonics substrate 301 but optically connected to the input coupler 305 by one or more of a waveguide, optical jumper fiber, lenses, or other optical routing elements.

Figure 4:
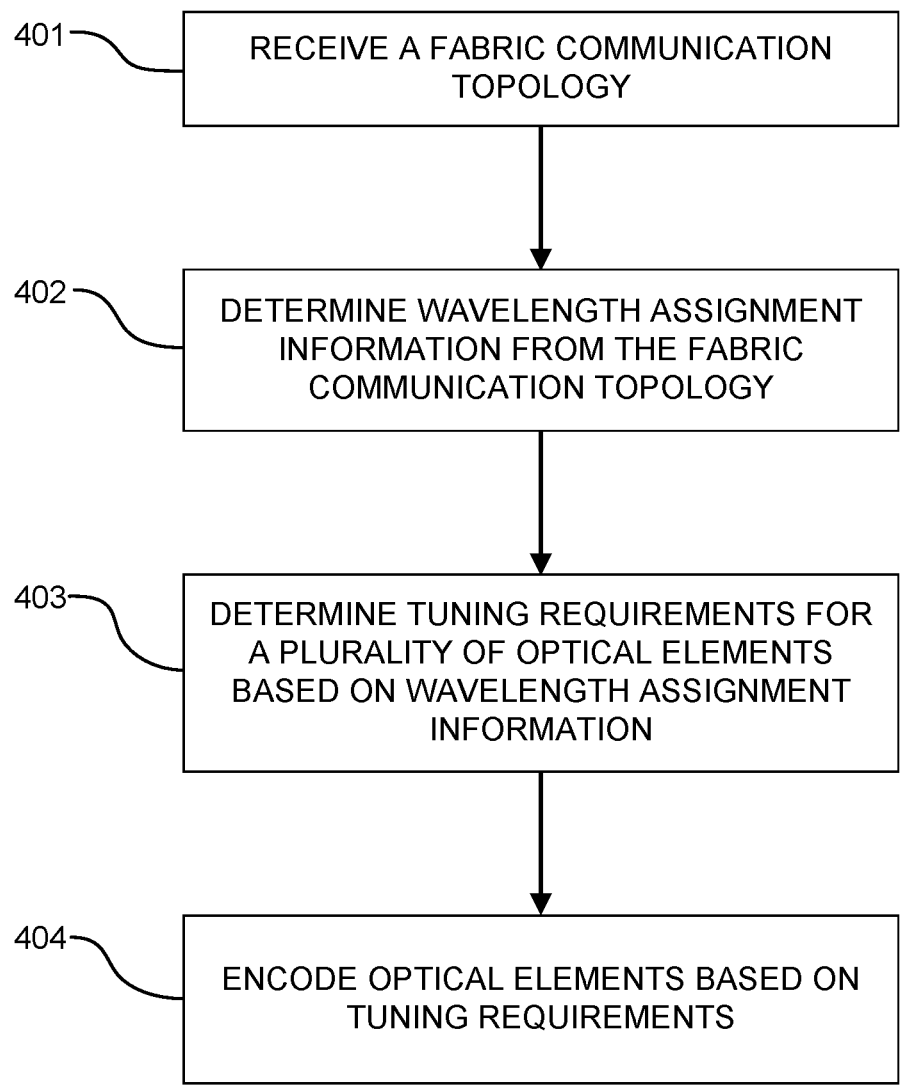
FIG. 4 shows an example method in accordance with embodiments of the technology disclosed herein.

FIG. 4 illustrates an example method 400 in accordance with embodiments of the technology disclosed herein. The method 400 is provided for illustrative purposes only and should not be interpreted as limiting the scope of the technology to only the depicted example. For ease of understanding, reference may be made to the depicted example in FIGS. 2A and 3 to provide examples of the operations. As shown in FIG. 4, a fabric communication topology is received at operation 401. The topology 401 may be received by a processing component communicatively coupled to a photonics interface system, such as the photonics interface system 300 discussed with respect to FIG. 3. In various embodiments, the processing component may comprise a programming processor of the photonics interface system, such as the programming processor 314 of FIG. 3. In some embodiments, the processing component may comprise one or more main processors of the respective node. In various embodiments, the fabric communication topology comprises a topology architecture for communication between nodes within a network. As a non-limiting example, a fabric communication topology may indicate the inter-cluster direct connections 202 and the intra-cluster direct connections 201 that define the network.

Referring to FIG. 4, wavelength assignment information is determined by the processing component based on the received fabric communication topology at operation 402. In various information, the fabric communication topology may include an assignment of wavelengths (both localized and inter-cluster) and determining the information may comprise identifying the wavelength assignments within the received fabric communication topology. In some embodiments, the processing component may determine the wavelength assignment information based on the direct connections data included within the fabric communication topology data received. At operation 403, the programming component can determine the tuning requirements for the plurality of optical elements of the photonics interface system. Non-limiting examples of the optical elements include the optical filters, the optical modulators, routing elements, and coupling components discussed with respect to FIG. 3. In various embodiments, determining the tuning requirements may comprise defining one or more stimuli to apply to the optical elements using one or more tuning components. As a non-limiting example, the programming processor can determine that the node 102a-1 is to be assigned localized frequency $\lambda_{a1}$ and inter-cluster frequency $\lambda_{a3}$, and determine the stimuli necessary to tune the node receivers 307, 312a, 312b of FIG. 3 to detect and filter out light at those frequencies.

At operation 404, the wavelength assignments can be encoded in the optical elements of the photonics interface system. Encoding the assignment information can comprise applying the stimuli determined at operation 403 to the one or more tuning components such that light of a frequency associated with the instant node is filtered out and detected, while all other light signals are passed through without any interaction on the part of the processing components of the instant node. In this manner, data is capable of being routed from a node in one cluster to a node in another cluster at the speed of light, and without the need for a direct, physical connection. That is, indirect communication using the technology disclosed herein does not add latency to the transmission, unlike traditional NIC approaches that require intermediate nodes to convert the optical signal. This reduces the fiber management issues caused by the exponentially greater amount of physical optical cables required for large topologies, such as those used in HPC.

The technology disclosed herein enables large network topologies to be scaled up without exponentially increasing the fiber management costs of the network. Moreover, the photonics interface system of each node enables near zero latency routing of data packets between the clusters and nodes, thereby reducing the overall latency in the system to solve complex problems. Rather than requiring physical direct connections between all of the nodes in the network, embodiments of the technology disclosed herein can enables non-directly connected nodes in the network to communicate with near zero latency, as if there was a direct connection between the nodes.

To scale up the network, either by adding more nodes to one or more clusters, adding one or more new clusters, or a combination of both, additional components can be added to the photonics interface systems at each node. FIG. 5 illustrates another example photonics interface system 500 in accordance with embodiments of the technology disclosed herein. The photonics interface system 500 is provided for illustrative purposes only and should not be interpreted as limiting the scope of the technology disclosed herein. For ease of reference, FIG. 5 shall be discussed with respect to a third cluster (e.g., cluster 101c from FIG. 1) to the network, but the discussion is applicable to any addition of more clusters and/or nodes. Where references are common between FIG. 5 and FIG. 3, the discussion of such references apply equally between figures, unless expressly stated otherwise. The example system 500 can include wavelength assignments in accordance with Table 3 below.

TABLE 3

| Cluster 101a | | | Cluster 101b | | |
|---|---|---|---|---|---|
| Node | Assigned Localized Frequency | Assigned Inter-Cluster Frequency | Node | Assigned Localized Frequency | Assigned Inter-Cluster Frequency |
| 102a-1 | $\lambda_{a1}$ | $\lambda_{a3}$ | 102a-2 | $\lambda_{a2}$ | $\lambda_{a3}$ |
| 102b-1 | $\lambda_{b1}$ | $\lambda_{b3}$ | 102b-2 | $\lambda_{b2}$ | $\lambda_{b3}$ |
| 102c-1 | $\lambda_{c1}$ | $\lambda_{c3}$ | 102c-2 | $\lambda_{c2}$ | $\lambda_{c3}$ |
| 102d-1 | $\lambda_{d1}$ | $\lambda_{a3}$ | 102d-2 | $\lambda_{d2}$ | $\lambda_{d3}$ |

| Cluster 101c | | |
|---|---|---|
| Node | Assigned Localized Frequency | Assigned Inter-Cluster Frequency |
| 102a-3 | $\lambda_{a4}$ | $\lambda_{a3}$ |
| 102b-3 | $\lambda_{b4}$ | $\lambda_{b3}$ |
| 102c-3 | $\lambda_{c4}$ | $\lambda_{c3}$ |
| 102d-3 | $\lambda_{d4}$ | $\lambda_{d3}$ |

As shown in Table 3, the third cluster 101c can have a localized set of wavelengths comprising ($\lambda_{a4}$, $\lambda_{b4}$, $\lambda_{c4}$, $\lambda_{d4}$), each assigned in a similar manner as that discussed with respect to Table 2 above. Moreover, the third cluster 101c can also utilize the inter-cluster set of wavelengths as the first and second clusters 101a, 101b. In various embodiments, each of the first, second, and/or third localized sets of wavelengths may comprise the same wavelengths. In such embodiments, the same wavelengths may be used locally within each cluster 101.

Figure 5:
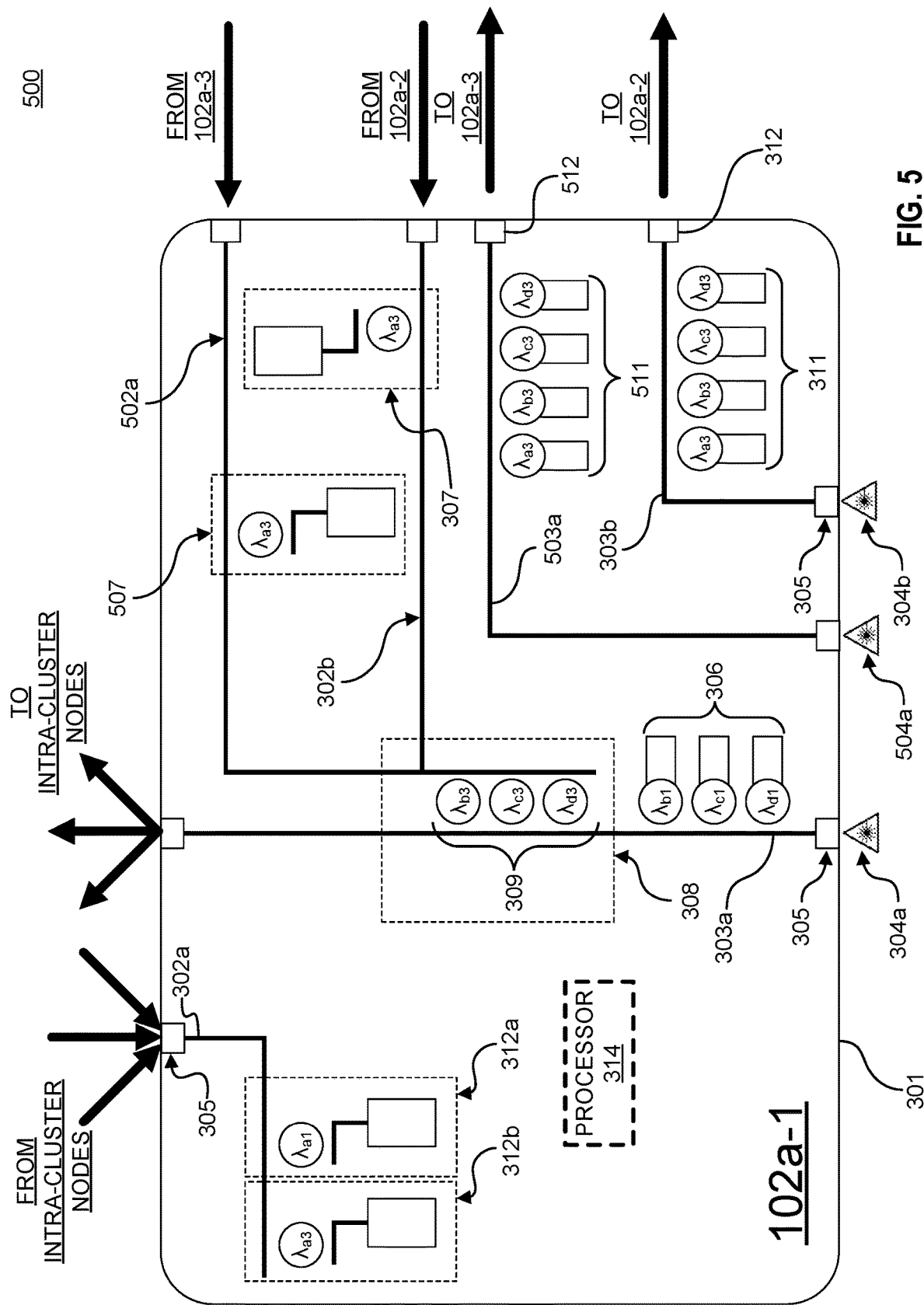
FIG. 5 illustrates another example photonics interface system in accordance with embodiments of the technology disclosed herein.

As shown in FIG. 5, the photonics interface system 500 can include the same components as those discussed with respect to FIG. 3. [[INVENTOR COMMENT: I was trying to put together an extra example with more than just two clusters. Please let me know what revisions need to be made. Thank you.]] In various embodiments, an additional inter-cluster transmission source 504a can be included, configured to output one or more wavelengths to be transmitted to the node 102a-3 of the third cluster 101c, which is the cluster interface for the node 102a-1 to the third cluster 101c. A second inter-cluster transmission routing element 503a is optically coupled to the inter-cluster transmission source 504a, and is configured to have one or more data signals modulated onto the wavelengths within the optical signal on the inter-cluster transmission routing element 503a by a second set of optical modulators 511. In addition, a second inter-cluster receive routing element 502a is included to receive an optical signal from the node 102a-3 of cluster 101c. The second inter-cluster receive routing element 502a can be configured in various embodiments to route frequencies (other than frequencies filtered out by the node receiver 507) to the interchange section 308 discussed with respect to FIG. 3. In various embodiments, a second interchange section (not shown in FIG. 5) may be included to handle signals from the node 102a-3.

In various embodiments, each node in a cluster may be associated with more than one wavelength (localized and/or inter-cluster). In such cases, each photonics interface system (300 and/or 500) can include one or more additional node receiver optically coupled to each of the intra- and inter-cluster receive routing elements and configured to detect the additional one or more frequencies associated with the node 102a-1.

Figure 6:
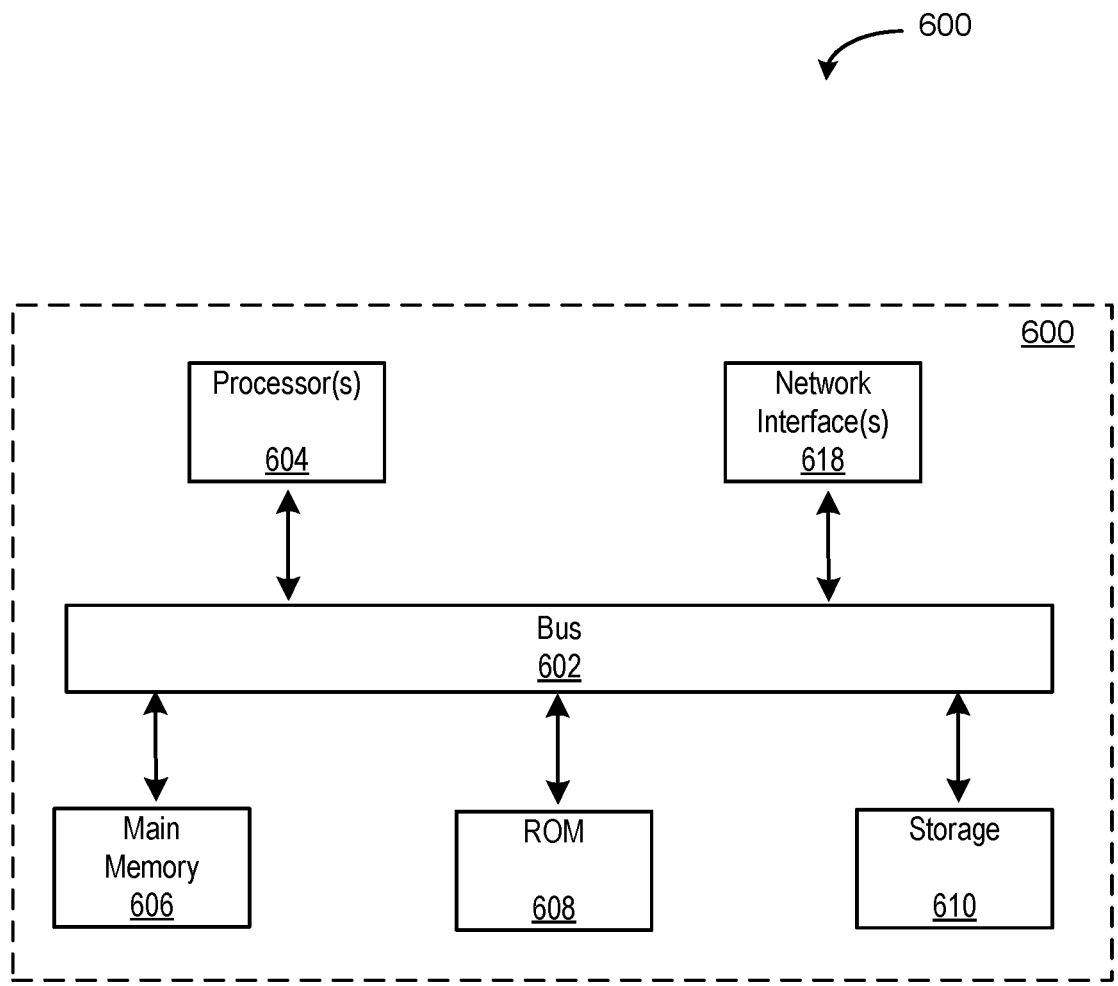
FIG. 6 is an example computing component that may be used to implement various features of embodiments described in the present disclosure.

FIG. 6 depicts a block diagram of an example computer system 600 in which various of the embodiments described herein may be implemented. In various embodiments, the computer system 600 may be implemented as a node 102 within the network 100 discussed with respect to FIGS. 1-5. The computer system 600 includes a bus 602 or other communication mechanism for communicating information, one or more hardware processors 604 coupled with bus 602 for processing information. Hardware processor(s) 604 may be, for example, one or more general purpose microprocessors. In various embodiments, one or more of the hardware processors 604 may comprise the programming processor 314 discussed with respect to FIGS. 3 and 5.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. In various embodiments, one or more memory components similar to main memory 606 may be disposed on one or more network interfaces 618 and configured to maintain wavelength assignment information, network topology information, or other configuration requirements for network interfaces such as, for example, the photonics interface system 300 and 500 discussed with respect to FIGS. 3 and 5.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information. In various embodiments, one or more of the network interfaces 618 may comprise the photonics interface system 300, 500 discussed with respect to FIGS. 1-5.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways.

Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A photonic interface system comprising:
    a node assigned to a first one or more inter-cluster wavelengths and comprising:
        a photonic substrate;
        at least one intra-cluster transmission routing element configured to transmit an intra-cluster optical signal to one or more local nodes within a first cluster of nodes;
        at least one inter-cluster receive routing element configured to receive an inter-cluster optical signal from a remote node within a second cluster of nodes;
        an interchange section comprising a portion of the at least one intra-cluster transmission routing element, a portion of the at least one inter-cluster receive routing element, and a plurality of optical filters optically coupled to the portion of the at least one intra-cluster transmission routing element and the portion of the at least one inter-cluster receive routing element; and
        an inter-node receiver comprising a photodetector, the inter-node receiver optically coupled to the at least one inter-cluster receive routing element between the interchange section and the remote node, the inter-node receiver configured to filter the first one or more inter-cluster wavelengths assigned to the node to the photodetector,
        wherein the interchange section is configured to add any inter-cluster wavelengths that are not assigned to the node and within the inter-cluster optical signal to the intra-cluster optical signal traversing through the at least one intra-cluster transmission routing element.

2. The photonic interface system of claim 1, further comprising a one or more intra-cluster optical modulators optically coupled to the at least one intra-cluster transmission routing element, each of the one or more intra-cluster optical modulators configured to modulate data onto a respective intra-cluster wavelength assigned to a respective local node.

3. The photonic interface system of claim 1, further comprising an output coupling component disposed on an output end of the at least one intra-cluster transmission routing element and configured to couple an intra-cluster optical signal to one or more local nodes.

4. The photonic interface system of claim 1, wherein the node comprises a direct connection to each of the one or more local nodes of the first cluster of nodes and a remote node of a second cluster of nodes.

5. The photonic interface system of claim 4, wherein the node comprises a direct connection to a remote node in each of a plurality of clusters of nodes connected over a communication fabric.

6. The photonic interface system of claim 1, further comprising:
    at least one inter-cluster transmission routing element optically coupled to an inter-cluster transmission source at an input end and transmit an inter-cluster transmission optical signal from an output end to the remote node.

7. The photonic interface system of claim 6, further comprising one or more inter-cluster optical modulators optically coupled to the inter-cluster transmission routing element, each inter-cluster optical modulator configured to modulate data onto a respective inter-cluster wavelength assigned to a respective remote node within the second cluster of nodes.

8. The photonic interface system of claim 1, further comprising at least one intra-cluster receive routing element configured to receive at least one intra-cluster receive optical signal from one or more local nodes, and at least one intra-node receiver configured to detect an intra-cluster wavelength or inter-cluster wavelength assigned to the node.

9. The photonic interface system of claim 1, wherein light of an inter-cluster wavelength not assigned to the node and light of an intra-cluster wavelength not assigned to the node are routed to an output end of the at least one intra-cluster transmission routing element without analysis by the node.

10. The photonic interface system of claim 1, wherein at least the interchange section and the inter-node receiver are disposed on the photonic substrate.

* * * * *